United States Patent [19]

Uchida et al.

[11] 4,224,292

[45] Sep. 23, 1980

[54] CATALYTIC REDUCTION OF NITROGEN OXIDES

[75] Inventors: Mitsuo Uchida; Takeshi Okano, both of Machida; Kunichi Matsushita, Yokohama; Yasuo Oguri, Tokyo; Junji Saito, Machida; Takao Kaneko, Yokohama, all of Japan

[73] Assignee: Mitsubishi Chemical Industries, Limited, Tokyo, Japan

[21] Appl. No.: 966,660

[22] Filed: Dec. 5, 1978

Related U.S. Application Data

[63] Continuation of Ser. No. 844,438, Oct. 21, 1977, abandoned.

[30] Foreign Application Priority Data

| Nov. 1, 1976 [JP] | Japan | 51/131490 |
| Nov. 17, 1976 [JP] | Japan | 51/137977 |
| Nov. 17, 1976 [JP] | Japan | 51/137978 |
| Dec. 1, 1976 [JP] | Japan | 51/144118 |

[51] Int. Cl.$^2$ .................................................. B01D 53/34
[52] U.S. Cl. ................................... 423/239; 252/440; 252/457
[58] Field of Search ..................... 423/239 A, 351; 252/439, 440, 450, 455 R, 457

[56] References Cited

U.S. PATENT DOCUMENTS

| 3,915,896 | 10/1975 | Oliver | 252/455 |
| 3,939,104 | 2/1976 | Campbell et al. | 252/457 X |

FOREIGN PATENT DOCUMENTS

| 2504027 | 8/1975 | Fed. Rep. of Germany | 423/239 A |
| 2454515 | 5/1978 | Fed. Rep. of Germany | 423/239 |
| 51-16276 | 6/1976 | Japan | 423/239 |

Primary Examiner—G. O. Peters
Attorney, Agent, or Firm—Oblin, Fisher, Spivak, McClelland & Maier

[57] ABSTRACT

Nitrogen oxides in exhaust gases are catalytically reduced in the presence of oxygen and ammonia at 200° to 600° C. over a catalyst of at least one catalyst component selected from the group consisting of compounds of metals of Groups 1B, 5A, 6A, 7A and 8 of the periodic table, and lanthanides and tin which is supported on a specific carrier comprising a main component of calcium silicate.

10 Claims, No Drawings

CATALYTIC REDUCTION OF NITROGEN OXIDES

This is a continuation, of application Ser. No. 844,438, filed Oct. 21, 1977 now abandoned.

BACKGROUND OF THE INVENTION

The present invention relates to a catalytic reduction of nitrogen oxides. More particularly, it relates to a catalytic reduction of nitrogen oxides in an exhaust gas containing nitrogen oxides such as nitrogen monoxide and nitrogen dioxide (hereinafter referring to as $NO_x$) and sometimes sulfur oxides (hereinafter referring to as $SO_x$) which is discharged from a boiler, an internal combustion engine, a coke oven, a sintering furnace, and other industrial sources.

Description of Prior Arts $NO_x$ is toxic to the human body and it causes photochemical smog. It has been studied to remove $NO_x$ and various methods have been proposed. Among these methods, the reduction of $NO_x$ with a reducing agent of ammonia has been remarkably effective method because ammonia selectively reacts with $NO_x$ even in the case of high oxygen content.

The effective catalysts used in the method include the compounds of Pt, Cu, Fe, Cr, Mn, V, W, Mo, Sn, Ce, etc. The metal, the oxide, the sulfate or the mixture thereof is supported on a carrier of alumina or the metal, the oxide or the sulfate itself is molded to use as the catalyst.

In general, it is not advantageous to use the metal, the oxide or the sulfate itself in a molded form from the viewpoint of the catalytic activity and the economical value. It is usual to use the catalytic component supported on a carrier such as alumina. However, the combustion exhaust gases usually contain $SO_x$ together with $NO_x$. In the wet desulfurization which has been employed as the method of removing $SO_x$, suitable temperature is lower than suitable temperature in the catalytic reduction of nitrogen oxides whereby it is required to carry out the catalytic reduction of nitrogen oxides prior to the desulfurization. In this case, $NO_x$ should be removed in the presence of $SO_x$. Most of the conventional carriers used in the catalysts have been modified by the effect of $SO_x$ whereby they have disadvantages in the practical uses as the strength of the carrier is lowered and the catalytic activity is deteriorated during the use of the catalyst.

The inventors have studied on effective catalysts for catalytically reducing $NO_x$ in an exhaust gas containing $NO_x$ and $SO_x$ with a reducing agent of ammonia, and they have found that the catalytic reduction of $NO_x$ with ammonia can be effectively attained by using a carrier comprising a main component of calcium silicate even though $SO_x$ is remained.

SUMMARY OF THE INVENTION

Accordingly, one object of the present invention is to provide a catalytic reduction of nitrogen oxides with high catalytic activity under maintaining the mechanical strength for a long time.

The foregoing and other objects of the present invention have been attained by providing a catalytic reduction of $NO_x$ in an exhaust gas in the presence of oxygen and ammonia at 200° to 600° C. over a catalyst of at least one catalyst component selected from the group consisting of compounds of metals of Groups 1B, 5A, 6A, 7A and 8 of the periodic table, and lanthanides and tin which is supported on a specific carrier comprising a main component of calcium silicate.

The method is especially advantageous when $SO_x$ is included in the exhaust gas.

DETAILED DESCRIPTION OF THE PREFERRED EMBODIMENTS

In the method of the present invention, a carrier comprising a main component of calcium silicate is used as the carrier of the catalyst.

Calcium silicate includes hydrates and anhydrates in various forms. The detail of the calcium silicate is described in the literatures such as H. F. W. Taylor: Chemistry of Cements 169 (1965; Takeshi Mitsuda: Ceramics 9 166–175 (1974) etc.

The compounds described can be used as the carrier in the method of the present invention. From the viewpoint of preparation, it is preferable to use Tobermorite, Xonotlite and a mixture thereof and CSH (I) and CSH (II) and $C_3S$, $C_2S$ as the anhydrides and Wollastonite.

In order to obtain the shaped carrier of calcium silicate, a silica source and a calcium source and optionally, a reinforcing fibrous material such as asbestos, glass fiber and rock wool are mixed together with water to form a slurry and the gelation of the slurry is performed, and then the gel is shaped by desired methods such as a pressure filter molding method, a sheet forming method or a casting method etc. and a curing in an autoclave is performed.

The shaped carrier can be also prepared by forming a slurry of calcium silicate hydrate crystals in a hydrothermal reaction by heating an aqueous slurry containing a silica source and a calcium source under compression and optionally mixing a reinforcing fibrous material and molding and drying it.

The carrier can contain the main component of calcium silicate as well as the other component such as silica, alumina, silicaalumina, diatomaceous earth, titania, zirconia, etc. The additional component can be added to the main component of calcium silicate before the molding or it can be coated on a surface of the shaped carrier.

In the method of the present invention, the carrier of the catalyst may be various shapes such as granules, spherical shape, pellets, rod shape, plate shape, cylindrical shape and honeycomb shape.

The reason why the carrier of the catalyst comprising the main component of calcium silicate is effectively used even though the exhaust gas contains $SO_x$, is depending upon the characteristics that a part of calcium silicate is converted into the $\beta$-calcium sulfate anhydrate and amorphous silica by the reaction of $SO_x$, however, the shape and the mechanical strength of the shaped carrier are not substantially changed.

When the shaped carrier is dipped in sulfuric acid, the effect of the carrier of the present invention can be further improved. The treatment can be carried out by dipping the shaped carrier in sulfuric acid or brushing or spraying sulfuric acid on the shaped carrier.

The concentration of sulfuric acid is depending upon the water absorption of the carrier and the dipping time in the case of the dipping method and it is usually higher than 1 N preferably 4 to 8 N. In accordance with the sulfuric acid treatment, at least surface part of the carrier is in a condition containing sulfuric acid, and then, calcium silicate reacts with sulfuric acid to form $\beta$-calcium sulfate anhydrate and amorphous silica. Even though a part of calcium silicate is decomposed by the chemical reaction, the mechanical strength as the carrier is not substantially changed. When the catalytic component is supported on the shaped carrier, the catalytic activity and the life of the catalyst are remarkably improved in comparison with the catalyst using the nontreated carrier.

The carrier impregnated with sulfuric acid is dried and calcined at 60° to 500° C. preferably 80° to 400° C. It is possible to wash the carrier with water before drying and calcining it. It is also possible to wash the calcined carrier with water and then to calcine it again.

The catalytic components supported on the carrier in the method of the present invention can be at least one metal compound selected from the group consisting of metals of groups 1B, 5A, 6A, 7A and 8 of the periodic table and lanthanides and tin, especially Cu, Sn, V, Cr, Mo, W, Mn, Pt, Fe and Ce. Platinum is supported in a form of metal. The other metal compounds are usually supported in a form of the oxide or the sulfate.

The amount of the catalyst component is usually 0.01 to 2 wt. % in the case of Pt and 1 to 60 wt.% in the case of the other metal compound.

The catalyst component can be prepared by the conventional method, for example, a method such as preparing an aqueous solution containing at least one water soluble salt of the catalyst component and dipping the carrier in the aqueous solution, or a method of spraying the aqueous solution on the carrier or a method of coating the aqueous solution on the carrier by a roller, a brush, etc.

In the present invention, the method of dipping the carrier in an aqueous solution of the catalyst component containing sulfuric acid is especially advantageous. The method can be carried out by dipping the shaped carrier in an aqueous solution containing a predetermined concentration of the catalyst component and sulfuric acid or coating the aqueous solution on the shaped carrier by a roller or spraying the aqueous solution on the carrier.

The concentration of sulfuric acid in the aqueous solution depends upon the water absorption capacity of the carrier and the dipping time in the case of the dipping method, and it is usually higher than 1 N preferably 4 to 8 N. In accordance with the treatment, the same effect with the sulfuric acid treatment of the shaped carrier before supporting the catalyst component, can be attained.

As the method of supporting the catalyst component on the shaped carrier, the catalyst can also be prepared by mixing the catalyst component with the source of carrier comprising the main component of calcium silicate and molding the mixture and followed by immersing it in sulfuric acid.

The carrier supporting the catalyst component is usually dried at 50° to 300° C. for several hours, and optionally reducing it or calcining it at 300° to 600° C. preferably 400° to 550° C. The catalyst component can partially be converted into the form of the metal or the oxide.

In the method of the present invention, the catalyst can be charged in the conventional catalyst reactor. But (when the catalyst is applied to reduce nitrogen oxides of an exhaust gas containing particulate and $SO_x$), it is especially effective to charge the catalyst by a parallel passage reactor system (hereinafter referring to as PPR system) wherein many plain catalyst layers are arranged in parallel with each gap to pass the gas through the spaces between the catalyst layers.

In order to contact the gas containing $NO_x$, $SO_x$, dust, oxygen and ammonia with the catalyst by the PPR system, it is effective to form the catalyst in plate shape, cyrindrical shape or honeycomb shape so as to form many passages in substantially straight and parallel in a reactor.

When the plate catalysts are used, many plate catalysts are arranged face to face with a uniform gap in parallel so as to form passages for the exhaust gas which are substantially straight and parallel between the plate catalysts, and the exhaust gas is passed along the surface of the plate catalysts in longitudinal direction.

In this case, the removal rate of $NO_x$ is improved depending upon the decrease of the gaps between the adjacent plate catalysts. When the gaps are too small, there are the disadvantages of the difficulty of processing, the increase of pressure drop and the accumulation of dust etc. The gap is usually in a range of 1 to 50 mm preferably 3 to 30 mm. The thickness of the plate catalyst is in a range of 3 to 20 mm preferably about 5 to 15 mm. When the thickness is too thick, the inner part of the plate catalyst does not contribute to the reduction of $NO_x$ whereby the amount of the catalyst should be increased and the size of the reactor is increased to be uneconomical. On the other hand, when the thickness is too thin, the mechanical strength of the catalyst is low to be disadvantageous in the handling of the catalyst. The width and the length of the plate catalyst is decided depending upon the space velocity of the exhaust gas and the desired removal rate of $NO_x$.

In accordance with the method of the present invention, it is possible to provide the catalyst having light bulk density and high mechanical strength used in an industrial process even though a large amount of the catalyst is used in PPR system to give the same removal rate of $NO_x$ with that attained by a packed catalyst reactor. The carrier of the present invention is economical and has excellent $SO_x$ resistance.

The amount of ammonia used in the method of the present invention is preferably more than stoichiometric amount for converting $NO_x$ to $N_2$ and it is in a mole ratio of more than 0.6, usually in a mole ratio of about 0.6 to 2 to $NO_x$ in the exhaust gas.

The effective catalyst activity of the catalyst used in the invention is imparted in the presence of more than 0.5 vol % of oxygen. In the absence of oxygen or the presence of less than 0.5 vol. % of oxygen, the catalyst imparts slight catalytic activity, however, the degree of the catalytic activity is too low as the industrial process. In usual, the catalytic activity is higher depending upon the increase of the concentration of oxygen. However, the increase of the catalytic activity is not found at more than 10 vol. % of oxygen.

In the effective operation of the method of the present invention, the temperature is in a range of 200° C. to 600° C. and the space velocity is in a range of 500 to 100,000 $hr^{-1}$, preferably 1,000 to 60,000 $hr^{-1}$.

As described above, the method of the present invention can be effective not only in a reduction of $NO_x$ in the exhaust gas containing no $SO_x$, but also in a reduction of $NO_x$ in the exhaust gas containing $SO_x$. The field of the application is remarkably wide and the method is remarkably advantageous in the industrial process.

Having generally described the invention, a further understanding can be obtained by reference to certain examples which are provided for purpose of illustration only and are not intended to be limiting unless otherwise specified.

In the examples, the concentration of $NO_x$ was measured by the chemiluminescence $NO_x$ analyzer (CLM-201 manufactured by Shimazu Seisakusho K.K.) in the case of a space velocity of 10,000 $hr^{-1}$, and by the constant potential electrolysis type $NO_x$-$SO_x$ analyzer (Model KNS-400 manufactured by Koritsu K.K.) in the case of a space velocity of 20,000 $hr^{-1}$.

EXAMPLE 1

Forty five (45) wt. parts of diatomaceous earth ($SiO_2$ of 89.2%; $Al_2O_3$ of 4.1%; $Fe_2O_3$ of 1.5%; CaO of 0.5%; MgO of 0.5% and ignition loss of 3.0%) and 45 wt. parts of quick lime, 10 wt. parts of amosite asbestos, and 1000 wt. parts of water were mixed and the mixture was heated at 90° C. for 2 hours under stirring. The resulting bulky gel was shaped in a 25 mm thick plate by a pressure filter molding and the shaped material was treated at 200° C. under 18 $Kg/cm^2$ for 6 hours in an autoclave. The resulting shaped material was cut into pieces having a size of about 5 mm × 5 mm × 5 mm and dried at 80° C. to obtain a carrier of calcium silicate (xonotlite) (specific gravity of 0.45; bending strength of 30 $Kg/cm^2$: as a plate).

Twenty (20) ml of the carrier was dipped in 20 ml of an aqueous solution containing 12 g of $Fe_2(SO_4)_3 \cdot 9H_2O$ for about 1 hour and the carrier was dried at 230° C. for 5 hours to obtain a catalyst supporting 38 wt. % of ferric sulfate.

In a Pyrex glass reactor having an inner diameter of 22 mm, 20 ml of the catalyst was filled and an exhaust gas containing 1000 ppm of $SO_x$, and 1000 ppm of $NO_x$, 1500 ppm of ammonia, 10 vol. % of carbon dioxide, 12 vol. % of steam, 10 vol. % of oxygen and the remainder of nitrogen was passed through the reactor at 10,000 $hr^{-1}$ of a space velocity. The removal rates of $NO_x$ at the specific temperature were measured by the equation.

$$\text{Removal rate of } NO_x(\%) = \frac{NO_x \text{ inlet} - NO_x \text{ outlet}}{NO_x \text{ inlet}} \times 100$$

wherein $NO_x$ inlet: concentration of $NO_x$ at inlet
$NO_x$ outlet: concentration of $NO_x$ at outlet The results are shown in Table 1. Weight % of active component with derived by the following equation.

$$\text{wt. \% of active component} = \frac{\text{catalyst weight} - \text{carrier weight}}{\text{catalyst weight}} \times 100$$

EXAMPLE 2

Fifty nine (59) wt. parts of Portland cement ($SiO_2$ of 21.7%; $Al_2O_3$ of 5.3%; $Fe_2O_3$ of 3.1%; CaO of 64.4%; MgO of 1.6%; $SO_3$ of 1.7% and ignition loss of 0.8%) and 32 wt. parts of diatomaceous earth, 9 wt. parts of chrysotile asbestos and 1000 wt. parts of water were mixed under stirring to form a uniform slurry and the mixture was heated at 80° C. for 2 hours to form a gel. The gel was molded in a form of sheet by a wet machine. The sheet was heated with steam under the pressure of 10 $Kg/cm^2$ for 8 hours and the product was cut into pieces having a size of about 5 mm × 5 mm × 5 mm and dried at 80° C. to obtain a carrier of calcium silicate (tobamolite) (specific gravity of 0.9; bending strength of 90 $Kg/cm^2$: as a sheet)

In accordance with the process of Example 1 using 20 ml of the carrier except supporting 12 wt.% of ferric sulfate, the catalyst is prepared and the reduction of $NO_x$ was carried out in the same condition.

The results are shown in Table 1.

EXAMPLE 3

In 20 ml of aqueous solution containing 9.5 g of $VOSO_4 \cdot 3H_2O$, 20 ml of the carrier of Example 1 was dipped for 1 hour and taken up and dried at 230° C. for 5 hours to obtain a catalyst supporting 41 wt. % of vanadyl sulfate.

In accordance with the process of Example 1 using 20 ml of the catalyst, the reduction of $NO_x$ was carried out. The results are shown in Table 1.

EXAMPLE 4

In accordance with the process of Example 3 except using 20 ml of the carrier of Example 2 and supporting 13.5 wt. % of vanadyl sulfate, the reduction of $NO_x$ was carried out.

The results are shown in Table 1.

EXAMPLE 5

In 20 ml of an aqueous solution containing 11.2 g of $CuSO_4 \cdot 5H_2O$. 20 ml of the carrier of Example 1 was dipped for 1 hour and taken out and dried and calcined at 350° C. for 3 hours to obtain a catalyst supporting 40 wt. % of cupric sulfate.

In accordance with the process of Example 1 except using the catalyst, the reduction of $NO_x$ was carried out. The results are shown in Table 1.

EXAMPLE 6

In accordance with the process of Example 5 except using 10.4 g of $Cr(SO_4)_3 \cdot 10H_2O$ instead of cupric sulfate and supporting 48 wt. % of chromium sulfate, the catalyst was prepared and the reduction of $NO_x$ was carried out. The results are shown in Table 1.

Table 1:

| | Amount of catalyst (g) | Reaction temperature (°C.) | Removal rate of $NO_x$ (%) |
|---|---|---|---|
| Example 1 | 8.83 | 300 | 50 |
| | | 320 | 63 |
| | | 350 | 77 |
| | | 370 | 83 |
| | | 400 | 89 |
| | | 430 | 90 |
| Example 2 | 11.79 | 300 | 57 |
| | | 320 | 68 |
| | | 350 | 80 |
| | | 370 | 86 |
| | | 390 | 90 |
| Example 3 | 8.83 | 280 | 59 |
| | | 300 | 64 |
| | | 350 | 73 |
| | | 400 | 78 |
| | | 420 | 79 |
| Example 4 | 11.69 | 300 | 44 |
| | | 320 | 52 |
| | | 350 | 62 |
| | | 370 | 68 |
| | | 400 | 76 |
| Example 5 | 8.82 | 300 | 44 |
| | | 350 | 62 |
| | | 400 | 67 |
| Example 6 | 9.62 | 250 | 50 |
| | | 300 | 62 |
| | | 350 | 70 |

Table 1:-continued

| Amount of catalyst (g) | Reaction temperature (°C.) | Removal rate of NO$_x$ (%) |
|---|---|---|
|  | 400 | 63 |

EXAMPLE 7

In accordance with the process of Example 1, the carrier of calcium silicate (xonotlite) was prepared. The carrier was dipped into 4N-H$_2$SO$_4$ for 10 minutes and dried at 230° C. for 5 hours and 20 ml of the carrier was dipped into 20 ml of an aqueous solution containing 12 g of Fe$_2$(SO$_4$)$_3$.9H$_2$O for 1 hour and taken out and dried at 230° C. for 5 hours to obtain a catalyst supporting 15 wt. % of ferric sulfate.

In accordance with the process of Example 1, the reduction of NO$_x$ was carried out. The results are shown in Table 2.

In a Pyrex glass reactor, 15 ml of the catalyst was filled and the following forced SO$_x$ poisoning test was carried out.

A gas containing 10,000 ppm of SO$_2$, 1,500 ppm of NO$_x$, 10 vol % of oxygen, 10 vol % of steam, 5 vol % of carbon dioxide and the remainder of nitrogen was passed through the reactor at 350° C. at 10,000 hr$^{-1}$ of a space velocity for the specific time and then, a gas containing 1,000 ppm of SO$_2$, 200 ppm of NO$_x$, 10 vol. % of oxygen, 10 vol % of steam, 5 vol % of carbon dioxide, 300 ppm of ammonia and the remainder of nitrogen was passed through the reactor at 20,000 hr$^{-1}$ of a space velocity and the removal rate of NO$_x$ was measured. The operation was repeated for several times. The relation of the removal rate of NO$_x$ and the time for the forced SO$_x$ poisoning of the catalyst is as follows.

| Time for forcible poisoning | 0 hr. | 25 hr. | 50 hr. | 70 hr. |
|---|---|---|---|---|
| Removal rate of NO$_x$ (%) | 77 | 77 | 75 | 75 |

Reference 1:

In accordance with the process of Example 7, except dipping the carrier in 4N-sulfuric acid, the catalyst supporting 38 wt. % of ferric sulfate was prepared, and the forced poisoning test was carried out.

The results are as follows.

| Time for forcible poisoning | 0 hr. | 25 hr. | 50 hr. | 70 hr. |
|---|---|---|---|---|
| Removal rate of NO$_x$ (%) | 65 | 60 | 60 | — |

EXAMPLE 8

In accordance with the process of Example 7 except washing the carrier with water at 60° C. for several times after dipping it in 4N-H$_2$SO$_4$, and calcining the carrier at 500° C. for 3 hours, the catalyst supporting 22 wt. % of ferric sulfate was obtained.

The removal rate of NO$_x$ at the specific temperatures are shown in Table 2.

The result of the forced SO$_x$ poisoning test was substantially the same with the result of Example 7.

EXAMPLE 9

In accordance with the process of Example 8, the carrier was dipped in 4N-H$_2$SO$_4$ and taken out and washed with water and calcined at 500° C. and then 20 ml of the treated carrier was dipped into 20 ml of an aqueous solution containing 9.5 g of VOSO$_3$.3H$_2$O for 1 hour and the carrier was taken out and dried at 230° C. for 5 hours to obtain a catalyst supporting 20 wt. % of vanadyl sulfate.

In accordance with the process of Example 1, using 20 ml of the catalyst, the removal rate of NO$_x$ at specific temperatures were measured.

The results are shown in Table 2.

Table 2:

|  | Amount of catalyst (g) | Reaction temperature (°C.) | Removal rate of NO$_x$ (%) |
|---|---|---|---|
| Example 7 | 13.5 | 300 | 64 |
|  |  | 350 | 85 |
|  |  | 400 | 90 |
|  |  | 420 | 92 |
| Example 8 | 11.45 | 300 | 65 |
|  |  | 350 | 86 |
|  |  | 400 | 92 |
|  |  | 420 | 93 |
| Example 9 | 11.14 | 300 | 60 |
|  |  | 350 | 74 |
|  |  | 400 | 79.5 |
|  |  | 420 | 79 |

EXAMPLE 10

In accordance with the process of Example 1, the carrier of calcium silicate (xonotlite) was prepared. The carrier was dipped into 20 ml of a 4N-H$_2$SO$_4$ solution containing 12 g of Fe$_2$(SO$_4$)$_3$.9H$_2$O for about 1 hour and taken out and calcined at 350° C. for 5 hours to obtain a catalyst supporting 30 wt. % of ferric sulfate plus sulfuric acid.

In accordance with the process of Example 1, except using the catalyst and passing the gas at 20,000 hr$^{-1}$ of a space velocity at 350° C., the reduction of NO$_x$ was carried out.

The removal rate of NO$_x$ at the initiation was 67%.

In accordance with the process of Example 7, the forcible SO$_x$ poisoning test was carried out for 50 hours and the removal rate of NO$_x$ in the same reaction condition was measured to give 63%.

On the other hand, the carrier of calcium silicate was dipped into an aqueous solution containing 12 g of Fe$_2$(SO$_4$)$_3$.9H$_2$O without sulfuric acid and calcined to obtain a catalyst supporting 38 wt. % of ferric sulfate.

The removal rate of NO$_x$ at the initial time by using the catalyst was 66%. The removal rate of NO$_x$ after the forced SO$_x$ poisoning test was 58%.

EXAMPLE 11

In accordance with the process of Example 10 except dipping the carrier of calcium silicate into 20 ml of a 4N-H$_2$SO$_4$ solution containing 9.5 g of VOSO$_4$.3H$_2$O, a catalyst supporting 30 wt. % of vanadyl sulfate plus sulfuric acid was obtained.

In accordance with the process of Example 7, the removal rate of NO$_x$ at the initial time and the removal rate of NO$_x$ after the forced SO$_x$ poisoning test were measured to give 62% and 58%, respectively.

EXAMPLE 12

Twenty (20) ml of the carrier of calcium silicate of Example 2 was dipped into a 8N-H$_2$SO$_4$ solution containing 12 g of ferric sulfate for about 1 hour and taken out and calcined at 350° C. for 5 hours to obtain a catalyst supporting 10 wt. % of ferric sulfate plus sulfuric acid.

In accordance with the process of Example 7, the removal rate of $NO_x$ at the initial time and the removal rate of $NO_x$ after the forced $SO_x$ poisoning test were measured to give 65% and 62%, respectively.

EXAMPLE 13

In accordance with the process of Example 1, the bulkyl gel was shaped by the pressure filter molding and the shaped material was heated at 210° C. under the pressure of 18 Kg/cm² for 6 hours in the autoclave and dried at 150° C. for 5 hours to obtain a sheet of calcium silicate (xonotlite)(thickness of 8 mm; specific gravity of 0.43). The sheet was cut into sheets having a size of 300 mm × 1000 mm.

Three of the sheets were dipped into 7.5 liters of an aqueous solution containing 4.5 Kg of $Fe_2(SO_4)_3.9H_2O$ for 1 hour and taken out and dried at 120° C. for 5 hours and calcined at 350° C. for 5 hours, to obtain three sheets of a catalyst supporting 35 wt. % of ferric sulfate. (bending strength of 25 Kg/cm²).

The bending strength of the catalyst was measured by the autograph (IS-5000 manufactured by Shimazu Seisakusho K.K.). A test piece having a size of 50 mm × 150 mm was cut out, and a breaking load was measured in the condition of 100 mm of a spam gap and 5 mm/min. of a cross head speed and the bending strength was calculated by the equation:

$$\text{Bending strenghth (Kg/cm}^2) = \frac{3 P \cdot L}{2 W \cdot t^2}$$

wherein
P: breaking strength (Kg)
L: span gap (cm)
W: width of test piece (cm)
t: thickness of test piece (cm).

The three sheets of the catalyst were disposed in a mild steel reactor having a sectional area of 54 mm × 310 mm in parallel to give 5 mm of a gap between the wall and the sheet of the catalyst and 10 mm of a gap between the sheets of the catalyst. The gas containing the following components was passed through the reactor in longitudinal direction and the removal rate of $NO_x$ was measured.

The gas contained 180 ppm of $NO_x$, 1000 ppm of $SO_x$ 20 wt. % of carbon dioxide, 3 wt. % of oxygen, 150 mg/Nm³ of a dust and the remainder of nitrogen, and ammonia was added to give $NH_3/NO_x = 1.0$.

The removal rate of $NO_x$ was measured at 350° C. and 400° C. in the condition of 66 Nm³/hr. of the flow velocity of the reaction gas, about 4000 hr⁻¹ of a space velocity, about 2.0 m/sec of a linear velocity, to give 39% and 44%, respectively.

EXAMPLE 14

In accordance with the process of Example 2, the slurry was heated at 80° C. for 2 hours to form the gel and the gel was shaped by a wet machine to obtain a sheet having 8 mm of a thickness by a sheeting machine and the sheet was heated with steam under the pressure of 10 Kg/cm² for about 8 hours and heated at 80° C. to obtain a sheet of calcium silicate (specific gravity of 0.9). The sheet was cut into sheets having a size of 300 mm × 1000 mm.

Three of the sheets were dipped into 7.5 liters of an aqueous solution containing 4.5 Kg of $Fe_2(SO_4).9H_2O$ for 1 hour and taken out and dried at 120° C. for 5 hours and calcined at 350° C. for 5 hours to obtain three sheets of a catalyst supporting 12 wt. % of ferric sulfate.

In accordance with the process of Example 13, the bending strength of the catalyst was measured to give 87 Kg/cm².

In accordance with the process of Example 13, the removal rates of $NO_x$ at 350° C. and 400° C. were measured to give 40% and 45% respectively.

EXAMPLE 15

In accordance with the process of Example 14, three sheets of the carrier of calcium silicate (thickness of 8 mm; width of 300 mm; length of 1000 mm) were dipped into 7.5 liters of an aqueous solution containing 3.6 Kg of $VOSO_4.3H_2O$ to obtain three sheets of a catalyst supporting 14 wt. % of vanadyl sulfate. The bending strength of the catalyst was 89 Kg/cm².

In accordance with the process of Example 13, the removal rates of $NO_x$ at 350° C. and 400° C. were measured to give 31% and 38%, respectively.

EXAMPLE 16

In accordance with the process of Example 13 except using 7.5 liter of an aqueous solution containing 3.9 Kg of $Cr_2(SO_4)_3.10H_2O$ instead of the aqueous solution of ferric sulfate, three sheets of the carrier of calcium silicate (thickness of 8 mm; width of 300 mm and length of 1000 mm) was treated to obtain three sheets of a catalyst supporting 40 wt. % of chromium sulfate. The bending strength of the catalyst was 20 Kg/cm².

In accordance with the process of Example 13, the removal rates of $NO_x$ at 350° C. and 400° C. were measured to give 35% and 31%, respectively.

EXAMPLE 17

In accordance with the process of Example 13, three sheets of the carrier of calcium silicate (thickness of 8 mm, width of 300 mm and length of 1000 mm) were dipped into $4N-H_2SO_4$ for 10 minutes and taken out and dried at 230° C. for 5 hours, and an aqueous solution containing 600 g/liter of ferric sulfate was coated on the surfaces of the three sheets with a brush and then an aqueous solution containing 800 g/liter of ferric sulfate was further coated on the surfaces and dried at 150° C. to obtain three sheets of a catalyst supporting 10 wt. % of ferric sulfate.

The bending strength of the catalyst was 20 Kg/cm².

In accordance with the process of Example 13, the removal rates of $NO_x$ at 350° C. and 400° C. were measured to give 43% and 46%, respectively.

EXAMPLE 18

In accordance with the process of Example 17, except dipping three sheets of the carrier of calcium silicate (thickness of 8 mm; width of 300 mm; length of 1000 mm) prepared as Example 14 into $8N-H_2SO_4$ for about 1 hour and taken out and dried at 230° C. for 5 hours before the treatment, three sheets of a catalyst supporting 5 wt. % of ferric sulfate were obtained. The bending strength of the catalyst was 85 Kg/cm².

In accordance with the process of Example 13, the removal rates of $NO_x$ at 350° C. and 400° C. were measured to give 40% and 45%, respectively.

EXAMPLE 19

In accordance with the process of Example 13 except dipping three sheets of the carrier of calcium silicate (thickness of 8 mm; width of 300 mm; length of 1000 mm) into 7.5 liters of a 4N-$H_2SO_4$ solution containing 4.5 Kg of ferric sulfate for about 1 hour, three sheets of a catalyst supporting 30 wt. % of ferric sulfate including sulfuric acid were obtained. The bending strength of the catalyst was 23 Kg/cm$^2$.

In accordance with the process of Example 13, the removal rates of $NO_x$ at 350° C. and 400° C. were measured to give 39% and 44%, respectively.

The removal rate of $NO_x$ was not substantially decreased after the continuous operation for 1 month.

What is claimed is:

1. A method of catalytically reducing nitrogen oxides which comprises contacting a combustion gas containing nitrogen oxides at a temperature of 200° to 600° C. in the presence of oxygen and ammonia with a catalyst comprising at least a catalytic component selected from compounds of copper and iron supported on a carrier comprising hydrated calcium silicate.

2. A method according to claim 1 wherein the shape of the catalyst is in a form of plate shape, cylindrical shape or honeycomb shape and the exhaust gas is passed through many passages which are respectively substantially straight and parallel which are formed by partitioning with many pieces of the catalyst.

3. The method of claim 1, wherein the hydrated calcium silicate is tobermorite or xonolite.

4. The method of claim 1, wherein the catalyst comprises an oxide, sulfate or oxysulfate of at least one of iron or copper.

5. The method of claim 1, wherein said combustion gas when contacted with said catalyst comprises nitrogen oxides and sulfur oxides.

6. A method of catalytically reducing nitrogen oxides which comprises contacting a combustion gas containing nitrogen oxides at a temperature of 200° to 600° C. in the presence of oxygen and ammonia with a catalyst comprising at least a catalytic component selected from compounds of copper and iron supported on a carrier comprising hydrated calcium silicate at least the surface of which comprises $\beta$-calcium sulfate anhydrate and amorphous silica.

7. The method of claim 6, wherein the hydrated calcium silicate is tobermorite or xonolite.

8. The method of claim 6, wherein the catalyst comprises an oxide, sulfate or oxysulfate of at least one of iron or copper.

9. The method of claim 6, wherein said carrier is prepared by treating hydrated calcium silicate with sulfuric acid.

10. The method of claim 6, wherein said catalyst is prepared by applying an admixture of said catalytic component and sulfuric acid to hydrated calcium silicate.